Oct. 12, 1937.                C. S. BROWN                2,095,914
                           CONDUIT OUTLET BOX
                         Filed Oct. 8, 1935           2 Sheets-Sheet 1

INVENTOR.
Charles S. Brown
BY
Bodell & Thompson
ATTORNEYS.

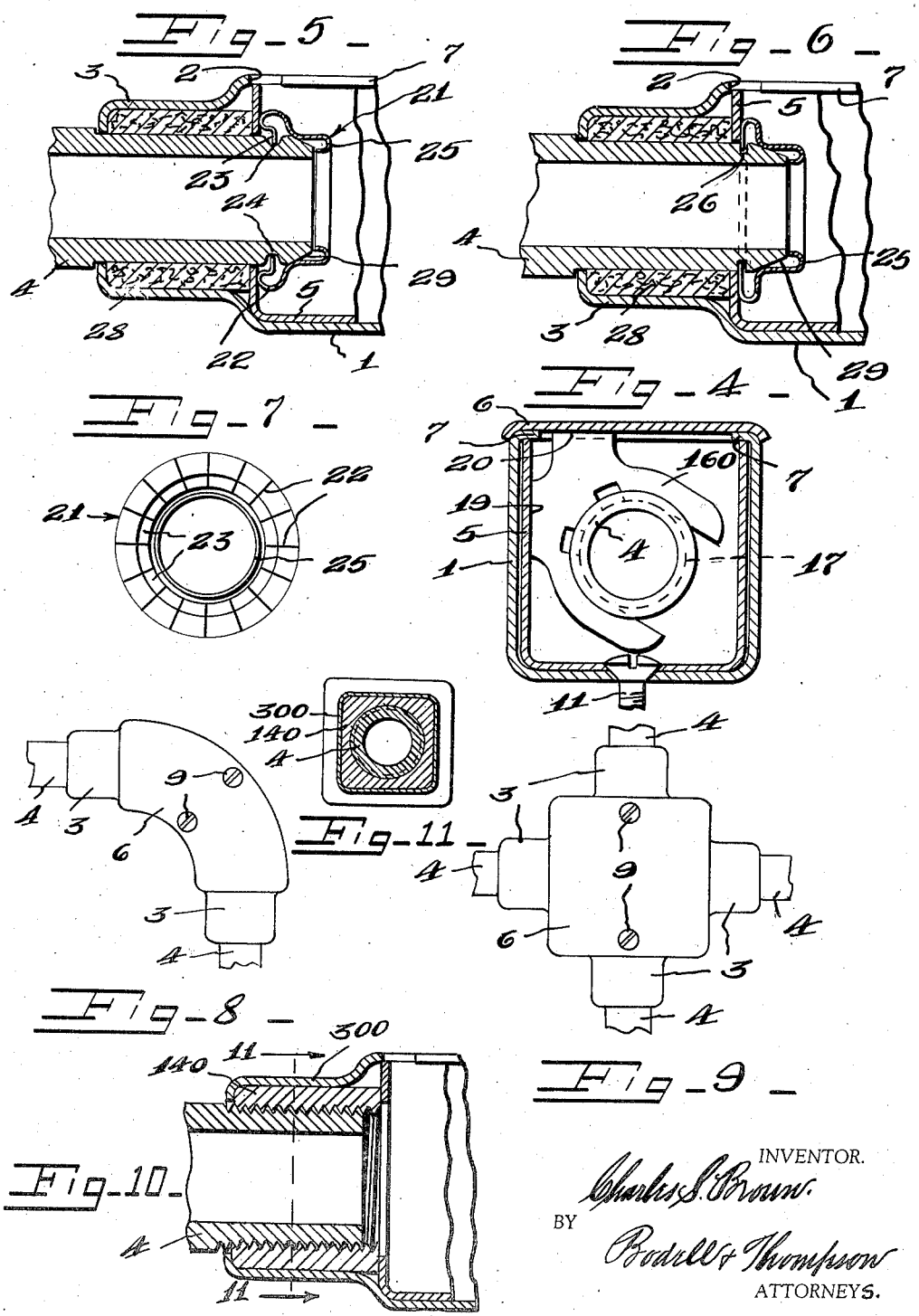

Patented Oct. 12, 1937

2,095,914

UNITED STATES PATENT OFFICE 2,095,914

CONDUIT OUTLET BOX

Charles S. Brown, Syracuse, N. Y.

Application October 8, 1935, Serial No. 44,078

5 Claims. (Cl. 247—15)

This invention relates to electric conduit outlet boxes, that is, boxes such as are used in electric conduit systems for the outlet of electric wires to lamps, switches, and other appliances, or for couplings giving access to the wires in continuous conduit lines, and has for its object a sheet metal conduit box, the body of which can be made from a piece or blank tubular in general form.

It further has for its object, an electric conduit outlet box, the body of which is made from a tubular piece and an internal box within the tubular body, forming the box compartment.

It further has for its object, a particularly simple and efficient means for coupling the conduits to the box.

Other objects will appear throughout the specification.

The invention consists in the novel features and in the combinations and constructions hereinafter set forth and claimed.

In describing this invention, reference is had to the accompanying drawings in which like characters designate corresponding parts in all the views.

Figure 4 is a view, similar to Figure 3, illustrating a modified form of means for locking the conduit to the box.

Figures 5 and 6 are fragmentary, longitudinal, sectional views illustrating a modified form of locking means from that shown in Figures 1, 2, 3 and 4.

Figure 7 is a detailed end view of the locking ferrule shown in Figure 5.

Figures 8 and 9 are diagrammatic views showing different forms of a conduit outlet box, Figure 8 showing an arcuate, or elbow, form of the box, and Figure 9 a square box with conduit connections on four sides thereof.

Figure 10 is a fragmentary view, similar to Figures 5 and 6, showing the box constructed or adapted to receive a threaded conduit.

Figure 11 is a sectional view on line 11—11, Figure 10.

Figure 1:
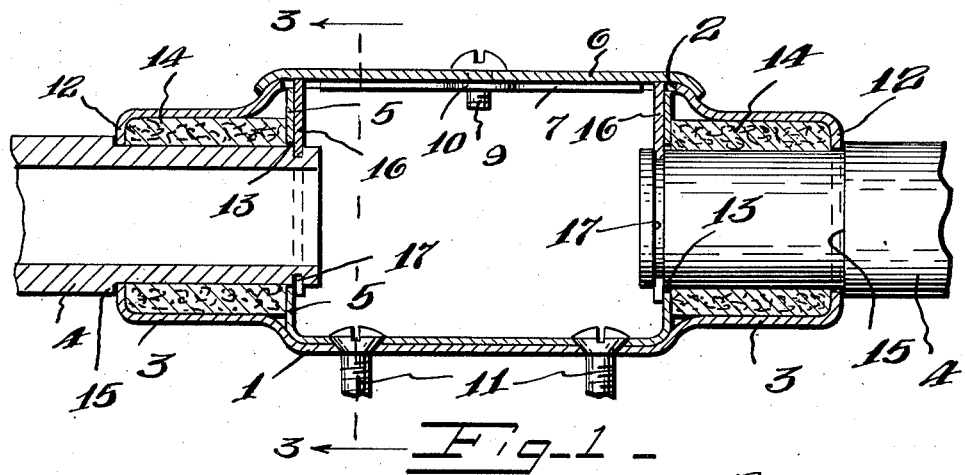
Figure 1 is a longitudinal, sectional view through a conduit outlet box embodying this invention, the contiguous portions of the conduit being shown.

This conduit outlet box comprises, generally, a hollow body having an opening in one side and bosses for receiving electric conduits, a box fitting the body substantially coextensive with the opening and having openings in walls thereof through which the conduits in the bosses extend, and a cover common to said opening and the open side of the box.

I designates the hollow body which is formed up of sheet metal tubular blank, it having an opening 2, usually rectangular, in one side, and bosses or nipples 3 for receiving electric conduits 4. The portion of the tubular body formed with the opening is also shown as formed to take a quadrangular shape both lengthwise and crosswise.

5 designates a box within the body, this being also of sheet metal and, because of the shape of the opening 2 and the hollow body 1, is quadrangular in shape lengthwise and crosswise, and substantially fitting the tubular body between the bosses, the open side of the box being in register with and nearly coextensive with the opening 2. 6 is a cover for the opening 2 and the open side of the box 5.

Figure 2:
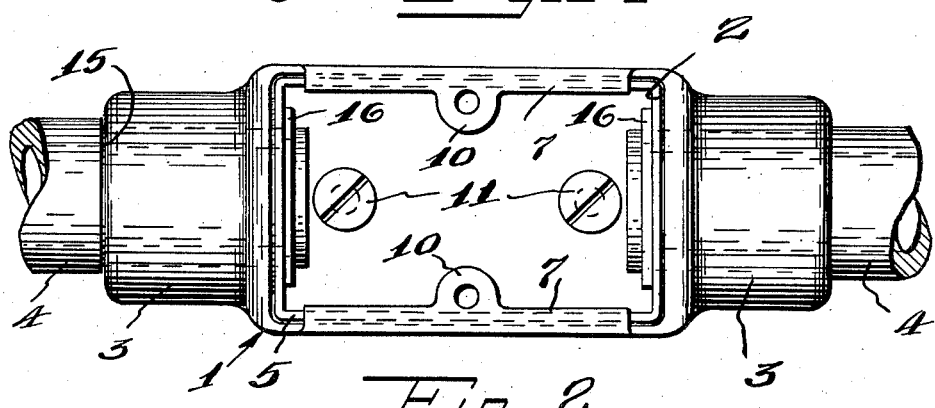
Figure 2 is a plan view of parts seen in Figure 1, the cover being removed.
Figure 3:
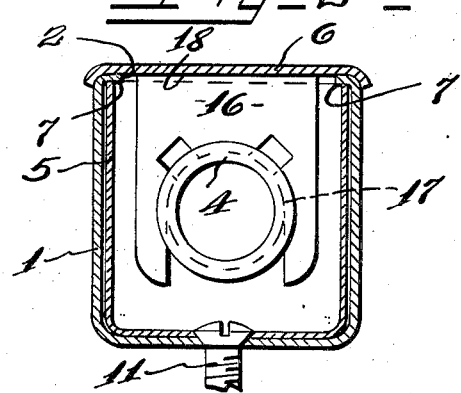
Figure 3 is a sectional view on line 3—3, Figure 1.

As seen in Figures 2 and 3, the tubular body is formed with flanges 7 extending inwardly over the edges of the side walls of the box 5 thus securing the box in the body, although the box is also held into place by spot welding it to the body. The cover laps the margin of the wall around the opening 2, and the flanges 7, and is secured in position in any suitable manner as by screws 9 extending through holes in the cover and into perforations in lugs 10 provided on the flanges 7. These covers may be provided with holes for the outlet of the wires, or may be the bases of electrical appliances mounted on the box. Also, the covers may be of sheet metal, or any other material. In conduit outlet box systems, the covers are formed of metal, or porcelain, or other insulation. The outlet box may be secured to a wall, or other support, as by screws 11 extending through the bottom thereof.

The ends of the bosses 3 are formed with inwardly extending annular flanges 12, and also the end walls of the box 5 are provided with openings 13 alined with the openings enclosed by the flanges 12, so that an annular space is provided within each boss, or nipple, in which may be located a more or less compressible heat resisting packing 14 between the boss and the conduit 4. Preferably, the conduit is formed with an annular shoulder 15 against which the flange 12 abuts when the conduit is in position, or coupled, to the box. The flange 12 locates the conduit with respect to the locking means within the box. One form of locking means is shown in Figures 1, 2 and 3, this including a bifurcated key 16 in the box adjacent the end walls thereof and interfitting into a groove 17 at the inner end of each conduit, so that the key 16, when in position, interlocks with the end of the conduit projecting into the box and holds the conduit from outward axial displacement. The key is held in position by the cover, it thrusting against the cover at 18, Figure 3, when the cover is in position. Hence, the cover prevents the displacement of the key, and the key can be inserted, or removed, when the cover is removed.

In Figure 4, a locking key 16a is shown, similar to the locking key 16. The key 16a, when in its final position, is arranged at an oblique angle to the open side of the box, and abuts at 19 against a side wall of the box, and at 20 against the cover when the cover is in position. In placing this key in position, it is moved into interlocking engagement with the conduit through the open side of the box, and then turned about the conduit until it abuts against the side of the box at 19, so that when the cover is removed, this locking means will not fall out, when the conduit is bottom side up.

In Figures 5 and 6, different forms of locking members are shown, these consisting of expansible and contractile ferrules slipping over the ends of the conduits and thrusting against the end walls of the box 5, and interlocking in grooves in the conduit ends.

21, Figure 5, designates the ferrule which is split radially at 22 to make it expansible and contractile, it having an inturned flange 23 interlocking in a peripheral groove 24 in the conduit, the ferrule having a portion 25 covering and abutting against the end of the pipe end. In Figure 5, the groove is formed with inclined, or cam-shaped, walls which permits the pulling out of the conduit if sufficient force is applied thereto.

In Figure 6, the groove 26 is formed with square sides which prevent the pulling out of the conduit. The end portions 25 of each ferrule shield the end of the pipe and form a smooth rounding collar or surface over which the wires pass.

The annular space within the boss 3 is provided with the sleeve 28 of compressible packing and heat resisting material which is compressed between the flange 12 and the opposing end wall of the box, and also between the periphery of the conduit and the inner cylindrical wall of the boss. The conduit end is formed tapered at 29, Figures 5 and 6, so as to be readily pushed through the packing sleeve 28 to slightly expand it outward and compress it and also, to facilitate the placing or slipping of the ferrule 21 thereon, and the expanding of the ferrule while being placed thereon.

In Figures 1 and 2, the box is shown as straight with nipples at its opposite ends. In Figure 8, the box is shown as arcuate, or in the form of an elbow, and in Figure 9 the box is shown as square with bosses on each side thereof. The body and box may be of other forms, as in the form of a T, Y, etc.

In Figures 10 and 11, the outlet box is shown as adapted to be used with the conventional threaded conduits, or installed in old systems, or the boxes substituted for the usual boxes in old systems. In outlet boxes for such uses, the boss or nipple 300 encloses a threaded, usually metal, sleeve 140 in place of the packing 14 in which the end of the conduit threads. In order to hold the threaded sleeve, which is virtually a nut, from turning, the nipple and sleeve are formed non-circular, or square, Figure 11.

In any form of my invention, the box is formed from a hollow sheet metal blank generally tubular body which can be formed up into the various shapes after having the opening provided therein, and when so formed, provides a box with one or more bosses or nipples. Also, in any form of my invention the body of the box is stiffened by an internal box secured within the body so that a rigid sheet metal box can be formed up economically which also alines and supports the inner ends of the conduits.

Also, in any form of my invention, the conduits are firmly secured in the boss without threaded couplings of any description.

What I claim is:

1. In an electric conduit outlet box, a sheet metal hollow body formed with an opening in one side and a boss for receiving an electric conduit, a sheet metal box fitting the body and substantially coextensive with said opening, with its open side toward said opening, the box having an opening in its side wall alined with the boss for receiving the inner end of the conduit, extending through the boss, the outer end of the boss having an internal annular flange enclosing an opening substantially fitting the conduit, and a heat insulating packing material within the boss around the conduit and between said flange and the end wall of the box.

2. In an electric conduit outlet box, a sheet metal hollow body formed with an opening in one side and a boss for receiving an electric conduit, a sheet metal box fitting the body substantially coextensive with said opening with its open side toward said opening, the box having an opening in a side wall alined with the boss for receiving the inner end of the conduit, the outer end of the boss having an internal annular flange enclosing an opening substantially fitting the conduit, and a heat insulating packing material within the boss around the conduit and between said flange and the end wall of the box, the conduit having an external shoulder against which said flange abuts, and means within the box and interlocking with the inner end of the conduit for holding the conduit from axial movement.

3. An electric conduit outlet box comprising a hollow body formed with an opening in one side and a hollow elongated nipple for receiving an electric conduit and providing an annular space around the conduit, a sheet metal box fitting the body and substantially coextensive with said opening with its open side coincident with the opening of the box, one of the walls of the box extending across the inner end of the nipple and formed with an opening for receiving the end of the conduit extending into the nipple.

4. An electric conduit outlet box comprising a hollow body formed with an opening in one side and a hollow elongated nipple for receiving an electric conduit and providing an annular space around the conduit, a sheet metal box fitting the body and substantially coextensive with said opening with its open side coincident with the opening of the box, one of the walls of the box extending across the inner end of the nipple and formed with an opening for receiving the end of the conduit extending into the nipple, and a sleeve located in the nipple and around the conduit and filling the annular space in the nipple, the sleeve abutting the end wall of the box.

5. An electric conduit outlet box comprising a hollow body formed with an opening in one side, and a hollow integral elongated nipple or boss projecting outward from the body for receiving an electric conduit, a sheet metal box fitting the body substantially coextensive with said opening with its open side toward the opening of the box, one of the walls of the box extending across the inner end of the nipple and formed with an opening for receiving the end of the conduit mounted in the nipple.

CHAS. S. BROWN.